United States Patent [19]

Grothe

[11] Patent Number: 5,038,848
[45] Date of Patent: Aug. 13, 1991

[54] APPARATUS FOR THE CONTINUOUS CASTING OF METAL

[75] Inventor: Klaus Grothe, Monheim, Fed. Rep. of Germany

[73] Assignee: Mannesmann AG, Düsseldorf, Fed. Rep. of Germany

[21] Appl. No.: 468,722

[22] Filed: Jan. 24, 1990

Related U.S. Application Data

[63] Continuation-in-part of Ser. No. DE88/00459, Jul. 21, 1988.

[30] Foreign Application Priority Data

Jul. 24, 1987 [DE] Fed. Rep. of Germany ....... 3725032

[51] Int. Cl.[5] ............................................. B22D 11/04
[52] U.S. Cl. ..................................... 164/478; 164/416
[58] Field of Search ................ 164/416, 260, 478, 71.1

[56] References Cited

U.S. PATENT DOCUMENTS 4,703,789 11/1987 Reichelt .............................. 164/154
4,807,691 2/1989 Schneider ........................... 164/416

FOREIGN PATENT DOCUMENTS 333997 12/1976 Austria .
0173089 3/1986 European Pat. Off. .
1433048 11/1968 Fed. Rep. of Germany .
1458011 11/1968 Fed. Rep. of Germany .
4488874 12/1974 Japan .

Primary Examiner—Kuang Y. Lin
Attorney, Agent, or Firm—Nils H. Jungman & Associates

[57] ABSTRACT

A apparatus for the production of a vertical lift movement of a continuous casting ingot mold for metal, especially steel, consisting of at least one mechanical drive element which can be adjusted in its lifting height and which produces an adjustable oscillation. The drive element is supported by a foundation and makes contact with an continuous casting ingot mold. The drive element, at least one of which is provided, has a rotary plate inclined to the longitudinal axis at an adjustable angle about a swivel axis. On the side facing the direction of lift and outside the axis of rotation of the plate 20, one end of a rod is situated, the other end of the rod being situated in an element which supports the mold.

20 Claims, 3 Drawing Sheets

APPARATUS FOR THE CONTINUOUS CASTING OF METAL

CONTINUATION IN PART STATUS

The present application is a continuation in part of Patent Cooperation Treaty Application No. DE88/00459, filed on Jul. 21, 1988, designating the United States, and claiming priority under 35 U.S.C. §119 from German Patent Application No. 37 25 032.9, filed on Jul. 24 1987.

BACKGROUND OF THE INVENTION

1. Field of the Invention

The present invention relates to an apparatus for the production of a vertical oscillatory lifting movement of a continuous casting ingot mold for metal, especially steel, the apparatus including at least one mechanical drive element which produces adjustable oscillations, which is supported by a foundation, and which moves a continuous casting ingot mold.

A high degree of operating reliability is required of the equipment employed for the oscillation of a continuous casting ingot mold for metal. It should be noted that the metal molds for continuous casting installations have a weight of about 60 tons and are typically located in the adverse and corrosive atmosphere of the pouring area, generally referred to as the "teeming aisle" in the trade. Despite these adverse conditions, high demands are nonetheless placed on the accuracy of the lifting adjustment.

2. Background Information

A mechanical press is described in published European Patent Application No. 073089, which has a drive element coupled to a shaft, the shaft being equipped with a connecting rod connected flexibly with a push-rod which is guided and is flexible in relation to the press table. An almost 90° angle is produced with this drive element and the output lift by the movement of the drive shaft. This document contains no suggestion for an arrangement for the production of a vertical lifting movement of continuous casting ingot molds where the rotation axis of a rotating plate is arranged in the same direction of movement of the ingot mold.

German Patent Application No. 1 4 33 048 shows a lifting device for metal molds consisting of a lifting control unit utilizing a driven disk. In the device disclosed, two-armed levers are located in the flux of force with the mold, and the movement of the shaft of the disk-like drive changes the vertical lift direction of the mold by 90° in relation to the crankshaft axis. Such an arrangement has a multitude of mechanical components which are connected with one other in a sliding manner. One particular disadvantage of this apparatus is, on one hand, the high wear and tear of the elements, and on the other hand, the inaccuracy during the guiding of the molds, due to the multitude of employed elements, reinforced again by the transmission of the two-armed levers which are employed.

A device for the oscillation of a mold in a continuous casting installation is disclosed in Japanese Utility Model No. 44 888/74, wherein eccentric shafts are located below the molds. This arrangement has the disadvantage that important components, which are in danger of wear or erosion, are located directly in the area of the mold. This holds particularly true for a possible lifting height adjustment.

An oscillation drive element is also shown in Austrian Patent No. 333 997, especially for use on molds in continuous casting installations. This oscillation drive element is part of a continuous casting installation, wherein the swivelling driven mold is located on one end of a balancing beam, on the other end whereof there is provided a pivoting connecting rod which is fastened to a transmission. The transmission contains a lifting adjustment gear unit which can be driven by a motor. A change in the oscillation amplitude can be achieved whereby the crankpin axle is relatively changed with the gear unit axle or with the axle of the driving tooth gear, respectively. During the operation of the oscillation drive, the crank shaft circles around the axle of the gear unit and, depending upon the angle of position of the crankpin, the crankpin likewise circles around the axle, whereby variable amplitudes may be generated.

One disadvantage of such an arrangement is that the eccentric cam can only be changed in rather large increments. These increments are achieved with only small reductions to the oscillations of the mold. Additionally, there is the fact that, especially with this type of installation with a balance beam, where there is a relatively large number of elements, especially bearing areas, inaccuracies in the adjustment of the lifting height may occur. One source of error can be found through the change of the levers of the balance beam and the connecting rod. Another source of error can be found in the system relating to the shaft and bearing, especially the change of the inside hole of the bearing through wear and tear.

Getriebeblättern AWF 633 T (an industrial publication whose name translates from the German as "Transmission Pages") discusses the lifting change during movement, and here lift change is known through the reciprocal rotation of a double eccentric (or cam) with the help of a worm gear transmission. [Reference is particularly made to the examples shown in pictures 6 and 7 of this publication.]In the same publication, under picture 1, a change in the eccentricity of one disk during the movement through a "wedge pushing transmission" is shown. In order to perform an adjustment, the wedge-shaped part has to be axially changed with the bearings. Both eccentrics are not suitable for a lift adjustment during operation.

Another mold drive is described in Stahlstrang-Giessanlagen G. Baumann, Verlag Stahl und Eisen mbH, Düsseldorf 1976, particularly in pictures 177 and 178 thereof, which show a lifting and lowering of a lifting table which is connected with a pushrod, as well as two steering mechanisms driven by a motor and bevel gearing which drives a crank disk drive.

One disadvantage of such an apparatus lies in the fact that, between the start and the stop of the lift movement, there is a relatively large number of parts, the accumulated errors of which lead to inaccuracies in the desired lifting movement.

Additional examples of continuous casting molds are disclosed in U.S. Pat. No. 4,807,691 to Schneider, et al., issued Feb. 28, 1989 and entitled "Mold for Continuous Casting of Metal" and in U.S. Pat. No. 4,703,789 to Reichelt, et al., issued Nov. 3, 1987 and entitled "Controlling Mold Oscillations."

OBJECT OF THE INVENTION

One object of the present invention is the provision of an apparatus for the production of a vertical lift movement which has a relatively simple type of wear resistant construction. Such construction is free and adjustable and contributes to the exact guidance of the mold. It also makes possible a precise lift adjustment during operation.

SUMMARY OF THE INVENTION

Advantageously, relatively few elements are required for an apparatus constructed according to the present invention. The areas of wear and tear are defined and can be controlled with an embodiment which permits easy maintenance. The influence of changes, perhaps the change of length due to thermostatical influences, can be neglected, due to the low structural height of the individual components, and additionally due to the low number of components employed. Therefore, there is only a small possibility for errors.

Moreover, the employment of exclusively mechanical elements, which are not combustible in comparison to hydraulic elements is well adapted to the intended area of operation.

The rotary plate is positioned substantially vertically to the lift movement and can be tilted around a rotating axle. The tilting action of the rotating plate determines the amplitude changes of the lifting process. This tilting action can be controlled with a high degree of accuracy and is infinitely variable by means of a simple adjustment element. Generated already by the proper length of the adjustment arm, there is a sufficient reduction of the adjusting path of the adjusting drive to the angle of the rotating plate. This permits an exact positioning. The customary setup work for the adjustment or the start of the oscillation device is not necessary, because the lift adjustment can be performed during operation.

During the use of a lifting apparatus constructed according to the present invention, it is possible to let the mold swing in a simple manner in a prearranged direction, for example, on a curved sector or track, because the individual rotary plates can be controlled independently of one another. Additionally, there is the possibility to have two lift elements which swing relatively towards each other in the same amplitude, and which swing together, for instance, during the lowering of a foundation.

Power for the lift movement is supplied to the positional center of the element which supports the continuous casting ingot mold. Therefore, a wandering of the mold in a horizontal direction seldom occurs, and if so only, in a very small amount, without any preference to a certain direction. As a result, the vertical guidance of the lifting requires only a simple element. One possibility would be a simple control handle. A very compact and preferred solution, however, is the vertical guidance by means of a piston in a cylinder. This cylinder, due to its high strength and stability is simultaneously suited for the mounting of the tilting mechanism of the rotary plate and for the transfer of force to the foundation. With this type of arrangement the customary installation of tie-rods and/or guide casings can be avoided.

The total weight of an oscillation device according to the invention is small, in view whereof a negative influence on the swinging behavior of the mold is not an expected factor.

Between the transfer of the lifting energy, the leverage is introduced axially into the rod that is supported by the mold carrying element via the ball ends on the rotary plate. Whenever possible, even if very minor wear occurs in the bearing, it will be effective in the direction of the axis of the rod, whereby a change of direction can easily be compensated for by tilting of the rotary plate. The otherwise customary wear inside of the bearings which are associated with the system of shaft and bearings, without the possibility of correction, does not occur in an apparatus constructed according to the invention.

Because the drive for the rotary table and the adjustment device are both very simple elements, for example, only a rod and shaft are required, the drive can be installed at a sufficient distance from the mold so that there is ample room in the area of the mold for other elements or other activities to occur.

In general, the invention features an apparatus for the continuous casting of metal, the apparatus including a continuous casting mold for receiving molten metal and for casting the molten metal; a support apparatus for supporting the continuous casting mold: and an oscillation apparatus for imparting an oscillating movement to the support apparatus and the continuous casting mold, the oscillation apparatus including: a sleeve member, the sleeve member being provided with a bore therein, the bore having a central longitudinal axis: a piston member slidably positioned within the bore provided in the sleeve member for reciprocal translation in directions along the central longitudinal axis of the bore: the piston member having a first end surface opposing and interconnected with the support apparatus, and the piston member also having a second end surface opposed to the first end surface; a rotary plate member rotationally mounted for rotation about an axis of rotation; a power apparatus for rotating the rotary plate member about the axis of rotation thereof: a connecting rod member having a first end contacting the second end surface of the piston member at a position substantially aligned with the central longitudinal axis of the bore, the connecting rod also having a second end contacting the rotary plate member at a piston substantially nonaligned with the central lonitudinal axis of the bore; and an adjustment apparatus for tilting the rotary plate member about a tilting axis, the tilting axis of the rotary plate member being substantially transverse to the central longitudinal axis of the bore.

BRIEF DESCRIPTION OF THE DRAWINGS

We turn now to a detailed description of a preferred embodiment of the invention, after first briefly describing the drawings, wherein.

DESCRIPTION OF THE PREFERRED EMBODIMENT

Figure 1:
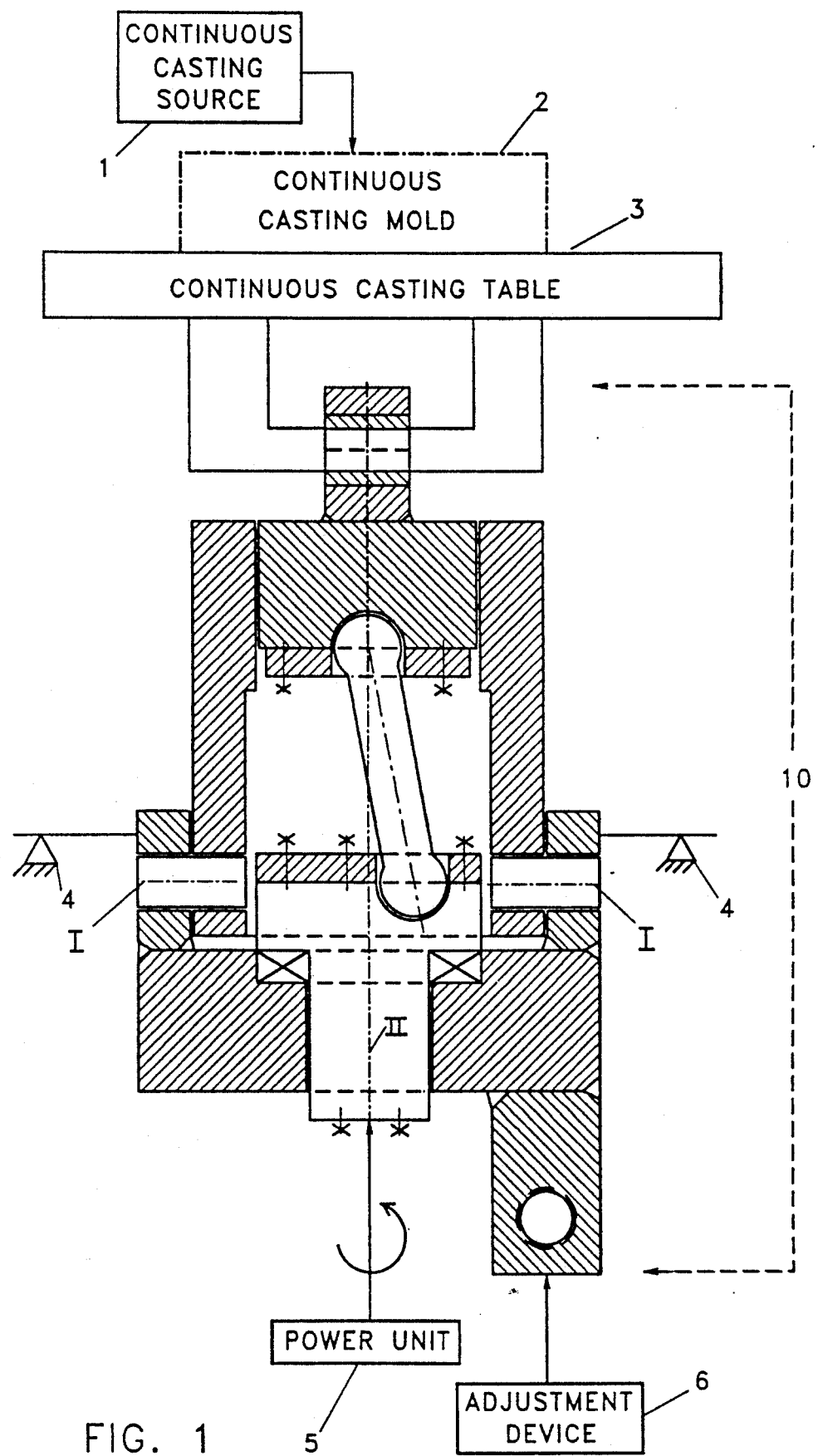
FIG. 1 is an elevational view of a continuous casting apparatus embodying the invention, wherein certain portions of the apparatus are shown schematically.

Referring first to FIG. 1, a continuous casting installation generally includes, in part, a continuous casting source 1 of molten metal which is continuously, rather than batch-wise, transferred to a continuous casting mold 2 supported by a continuous casting table 3. As is well known in the art, the continuous casting mold 2 should be imparted with an oscillatory motion during the casting process, in order to minimize the adherence of metal thereto. To this end, an oscillating drive apparatus 10 is interposed between the continuous casting table 3 and a foundation 4 of the continuous casting installation.

The oscillation drive apparatus 10 imparts an up and down (or lifting) motion to the continuous casting table 3. The oscillating drive apparatus is powered by a power unit 5, which may be any sufficiently powerful unit having a rotational output. The amplitude (i.e., the distance travelled) of the up and down motion imparted is variable through an adjustment device 6.

Figure 2:
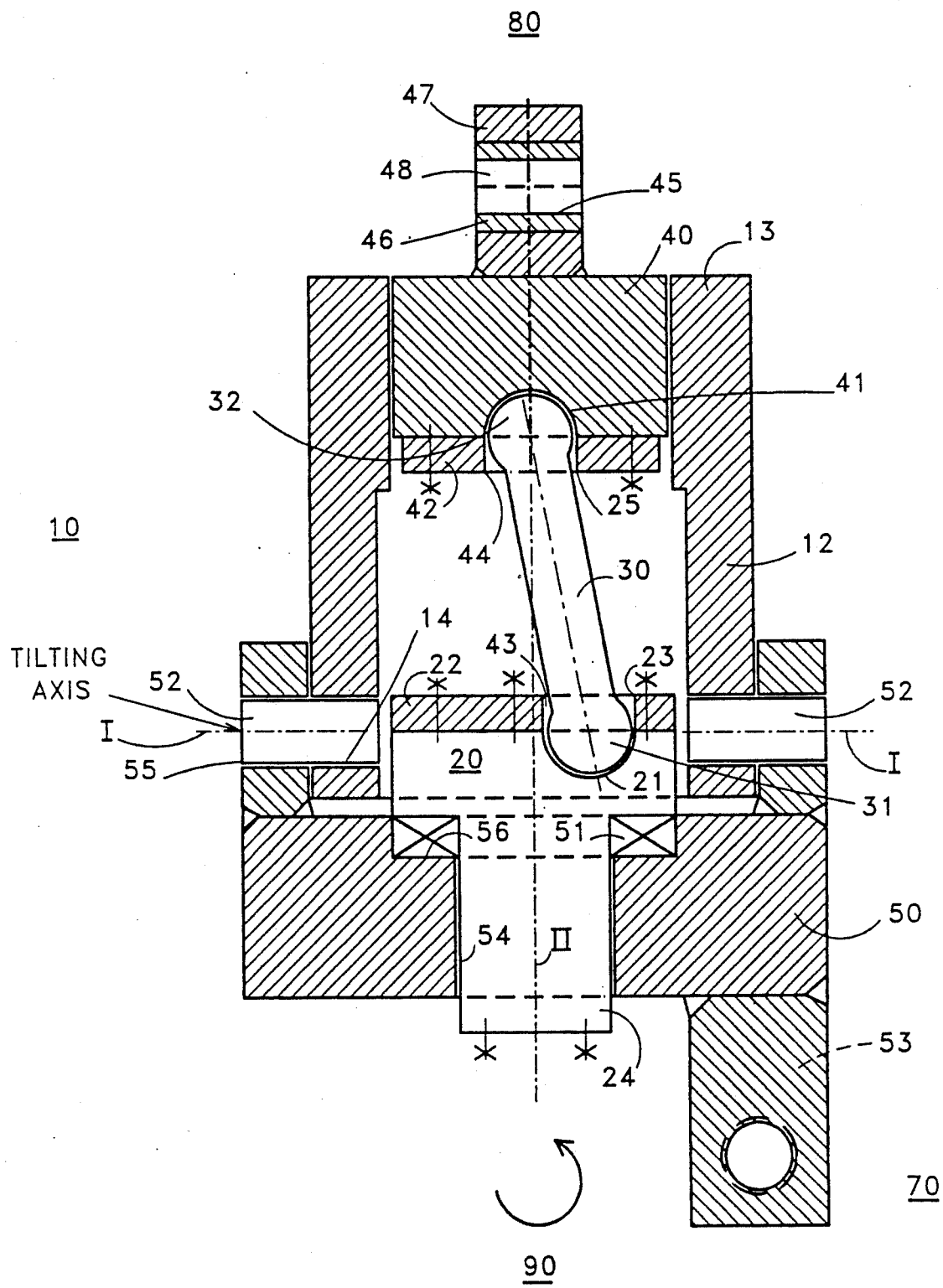
FIG. 2 is a front elevational sectional view of an oscillation device for a continuous casting mold embodying the invention.
Figure 3:
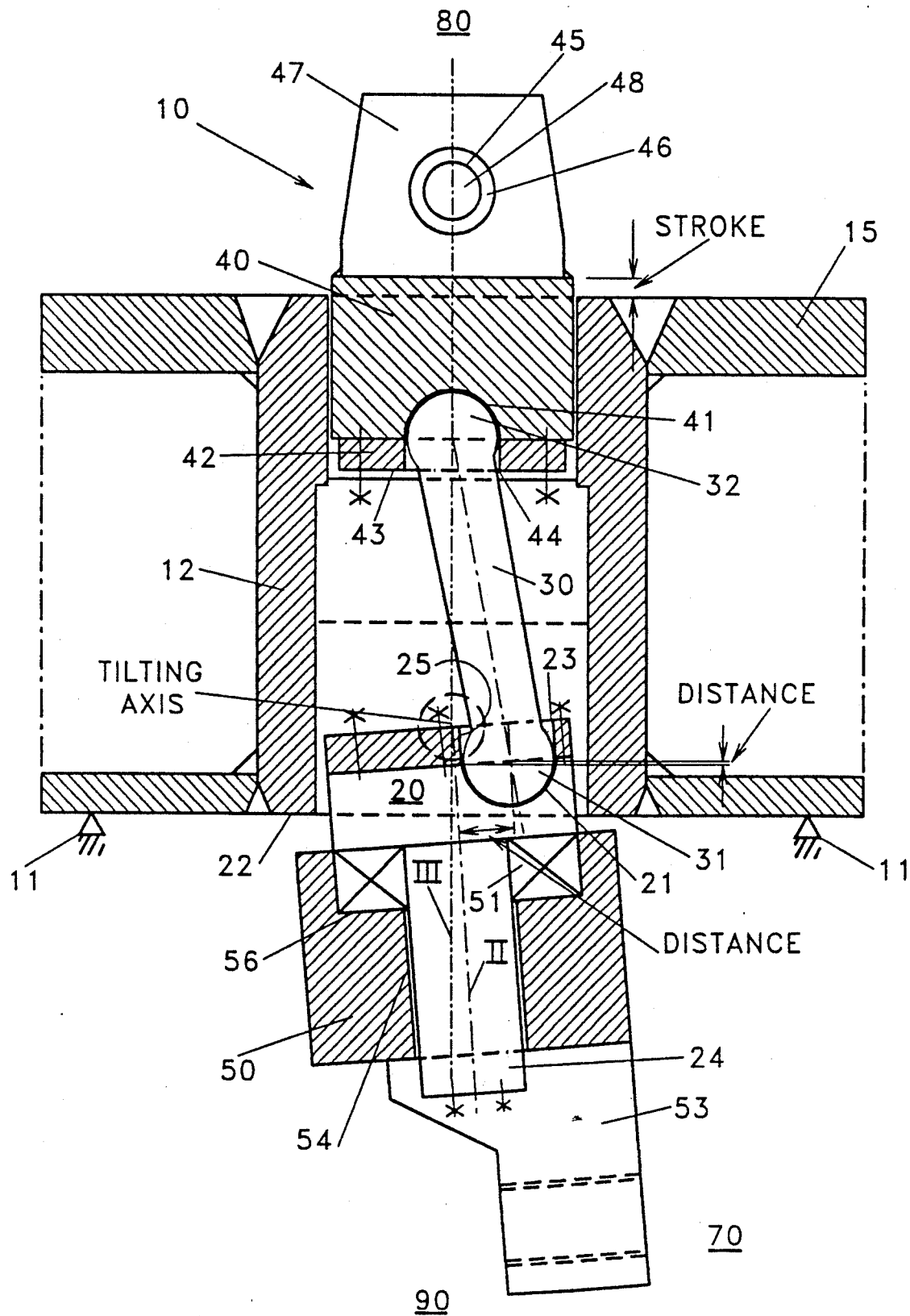
FIG. 3 is a side elevational sectional view of the oscillation device for the continuous casting mold of FIG. 1.

Referring now to FIGS. 2 and 3, which are sectional views of the drive apparatus 10, a container 50 encircles a sleeve 12, and the container 50 can be adjusted tiltably about a longitudinal axis I. A rotating plate 20, which is driven in a rotating fashion by the power unit 5 shown in FIG. 1 through a rotary shaft 24, is located within the container 50 and is connected, by means of a power transmitting rod 30, to a reciprocating piston 40, which is positioned within the sleeve 12. The relationship between the positioning of an adjustment flange 70, a table support 80 and a drive unit 90 (i.e., the power unit 5 in FIG. 1) for drive apparatus 10 is indicated by reference lines in the figures. In this regard, Roman Numeral I refers to an axis about which container 50 adjustably tilts, while Roman Numeral II indicates the rotational axis of the rotary plate 20.

Preferably, in the area indicated by reference numeral 13, between the sleeve 12 and the piston 40, a friction reducing bearing material is provided. The sleeve 12 is provided with borings 14 which are coaxial with the swivel axis I, and within which are situated two shafts 52 which extend into the borings 55 provided in the container 50, thereby allowing the container 50 to be tilted about axis I. Preferably, a pressure bearing 51 is located on the inside floor of the container 50. In the center of the container 50, there is a boring 54 for the insertion of the shaft 24 of the rotating plate 20. The container 50 can be tilted about axis I by means of the adjustment flange 70. The adjustment device 6 shown in FIG. 1 is attached to and used to push and pull the adjustment flange 70. The adjustment device 6 may be any conventional power positioning apparatus known in the mechanical art such as, for example, a hydraulically actuated piston.

The rotating plate 20 is supported on a pressure bearing 51. On the rotary plate 20, and on the piston 40, there are provided universal ball joint-like bearings 21 and 41, respectively. Each end of rod 30 is equipped with a ball end, that is, a ball end on the piston side 32 and a ball end on the plate side end 31. For reasons of assembly, the bearings of the rod ends are supplied with washers 22 and 42, respectively. These washers 22 and 42 have a ring surfaces 23 and 44, respectively, in openings 25 and 43, respectively. Due to these ring surfaces 23 and 44, respectively, it is possible to preload ball end 31 and/or 32, respectively.

Piston 40 is provided with a protruding connection flange 47 having a throughgoing hole 48, which is utilized as a fastening device and which is located on the side facing the mold 80 for the attachment and support of the continuous casting table 3 as indicated in FIG. 1. A dampening device 46 is preferably provided in the port area 45 of the hole 48, in order to reduce the impact between the mold 80 and the drive element 10.

In FIG. 3, the same elements and reference numerals are shown as were utilized in FIG. 1: additionally, a foundation 11 (i.e., substantially the same structure as foundation 4 shown in FIG. 1) for a carrying frame 15 of the drive element 10 is shown.

The number of the drive elements 10 which are located in the carrying frame 15 depends on the requirements at a given time. Generally speaking, there are preferably four driving elements 10 utilized. If so called mini-molds are being used, a single drive element 10 may be considered as being sufficient.

In summary, one feature of the invention resides broadly in an apparatus for the production of a vertical lift movement of a continuous casting ingot mold for metal, especially steel, consisting of at least one mechanical drive element, which can be adjusted in its lifting height and which produces adjustable oscillations. The drive element is supported by a foundation, and makes contact with a continuous casting ingot mold. The drive element (10) has a horizonally adjustable plate (20) inclined to its longitudinal axis (III) at a swivel axle (I) which is located vertically to the longitudinal axis (III) and which adjustable plate (20) is located inside of a container (50) and is driven by shaft (24). One end (31) of a rod (30 is situated for insertion on the side (21) facing the direction of lifting and is outside of the rotation axis III, and the other end (32) of the rod (30) is situated in an element (40) which supports the mold (80).

Another feature of the invention resides broadly in a device to produce a vertical lift movement which is characterized by the fact that the element (40) is a piston which can be moved within the sleeve (12), which sleeve is connected to the foundation (11).

Yet another feature of the invention resides broadly in a device to produce a vertical lift movement which is characterized by the fact that there are provided elements (13) which are located between the piston shaped element (40) and the sleeve (12) and which are sliding so as to be wear resistant.

A further feature of the invention resides broadly in a device to produce a vertical lift movement is characterized by the fact that fastening devices (47) are located on element (40) located on the side which faces the mold.

A yet further feature of the invention resides broadly in a device to produce a vertical lift movement which is characterized by the fact that a compound (46) located between the fastening device (47) and the mold (80) is made from a shock dampening material.

Yet another further feature of the invention resides broadly in a device to produce a vertical lift movement which is characterized by the fact that the bearings (21, 41) have a ball-like shape.

An additional feature of the invention resides broadly in a device to produce a vertical lift movement which is characterized by the fact that removable ring-shaped washers (22,42) are located in the rotary plate (20) and the element (40), on the side facing the rod (30), and there is an opening in the center of the washers which has a ring surface (23, 44) with a ball-like contour on the side facing the rod.

A yet additional feature of the invention resides broadly in a device to produce a vertical lift movement which is characterized by the fact that the removable washers (22) are attached to the rotary plate (20) and the removable disks (42) of the element (40), and they are fastened in such a way that the center- point of the plane pointing towards the rod is guided through the midpoint of the ball-shaped bearing (21, 41).

A further additional feature of the invention resides broadly in a device to produce a vertical lift movement which is characterized by the fact that, on the rotary plate (20), there is a bearing (51) which runs vertical to the direction of lift, and this bearing 51 is located within a supportive container (50).

A yet further additional feature of the invention resides broadly in a device to produce a vertical lift movement which is characterized by the fact that the shaft (52) is located coaxially to the rotating axis (II) of the container (50).

Another further additional feature of the invention resides broadly in a device to produce a vertical lifting movement is which characterized by the fact that the crank shaft (52) is located rotatable in the opening of the guide sleeve (12).

A yet another additional feature of the invention resides broadly in a device to produce a vertical lift movement which is characterized by the fact that there is an adjustable arm (53) attached to the container (50) vertically to the rotating axis (II).

Another yet further feature of the invention resides broadly in a device to produce a vertical lift movement which is characterized by the fact that the adjustable arm (53) is connected to an adjustable device (70).

A still further feature of the invention resides broadly in a device to produce a vertical lift movement which is characterized by the fact that there is a shaft (24) which is located centrally to the opposite side of the bearing (21) located on the rotating plate (20), the shaft (24) being guided through the opening (54) in the container (50).

A still further additional feature of the invention resides broadly in a device to produce a vertical lift movement which is characterized by the fact that the shaft (24) is connected to a drive unit (90).

All, or substantially all, of the components and methods of the various embodiments may be used with at least one embodiment or all of the embodiments, if any, described herein.

All of the patents, patent applications, and publications recited herein, if any, are hereby incorporated by reference as if set forth in their entirety herein.

The invention as described hereinabove in the context of the preferred embodiment is not to be taken as limited to all of the provided details thereof, since modifications and variations thereof may be made without departing from the spirit and scope of the invention.

What is claimed is:

1. An apparatus for the continuous casting of metal, said apparatus comprising:
    continuous casting mold means for receiving molten metal and for casting the molten metal;
    support means for supporting said continuous casting mold means; and
    oscillation means for imparting an oscillating movement to said support means and said continuous casting mold means; said oscillation comprising means:
    a sleeve member, said sleeve member being provided with a bore therein, said bore having a central longitudinal axis:
    a piston member slidably positioned within said bore provided in said sleeve member for reciprocal translation in directions along the central longitudinal axis of said bore:
    said piston member having a first end surface opposing and interconnected with said support means, and said piston member also having a second end surface opposed to said first end surface:
    a rotary plate member rotationally mounted for rotation about an axis of rotation:
    power means for rotating said rotary plate member about the axis of rotation thereof;
    a connecting rod member having a first end contacting said second end surface of said piston member at a position substantially aligned with the central longitudinal axis of said bore, said connecting rod also having a second end contacting said rotary plate member at a position substantially nonaligned with the central longitudinal axis of said bore; and
    adjustment means for tilting said rotary plate member about a tilting axis, the tilting axis of said rotary plate member being substantially transverse to the central longitudinal axis of said bore.

2. An apparatus, as defined by claim 1, which includes means for stationarily positioning said sleeve relative to said piston, and
    an arm connected to said adjustment means for imparting a lifting force to said rotary plate member for adjusting the position of said piston within said sleeve.

3. An apparatus as defined by claim 1, which includes means located in said sleeve for reducing the friction between said piston and said sleeve.

4. An apparatus as defined by claim 1, wherein said piston means includes a fastening device protruding from said piston member first end surface toward said support means, and
    means for connecting said fastening device to said support means.

5. An apparatus as defined by claim 1, which includes,
    means connecting said piston member to said support means for dampening the impact of the force transmitted by power means through said piston member to said support means.

6. An apparatus as defined by claim 1, wherein said connecting rod member first and second ends are ball shaped, and
    said piston member and said rotary plate member including means for receiving said rod member first and second ball shaped end portions respectively to universally connect said connecting rod to said piston member and said rotary plate member.

7. An apparatus as defined by claim 6, which includes a first washer positioned on said piston member second end portion oppositely of said connecting rod first end,
    a second washer positioned on said rotary plate member oppositely of said connecting rod second end, and
    said first and second washers each having openings forming ring surfaces for receiving said connecting rod first and second ends for universal movement of said piston member and said rotary plate member relative to said connecting rod.

8. An apparatus, as defined by claim 7, wherein said rod member first and second ball shaped end portions are universal bearings for connecting said rod member to said piston member and said rotary plate member,
    each of said universal bearings having a midpoint centered on a longitudinal axis of said rod member,
    said first and second washers each having a center-point, and
    said center-point of said first washer being aligned in a plane passing through said midpoint of said universal bearing on said rod member first end portion and said center-point of said second washer being laterally displaced from a plane passing through said midpoint of said universal bearing on said rod member second end portion.

9. An apparatus as defined by claim 1, which includes a support member surrounding said rotary plate member, bearing means for rotatably supporting said rotary plate member in said support member, and said rotary plate member having an axis of rotation tiltable with respect to said central longitudinal axis.

10. An apparatus as defined by claim 9, which includes means for connecting said support member to said sleeve member for tilting movement of said support member together with said rotary plate member about a tilt axis relative to said sleeve member, and said tilt axis intersecting said central longitudinal axis.

11. An apparatus as defined by claim 9, which includes a shaft extending through aligned bores in said support member and said sleeve member to connect said support member to said sleeve member for tilting movement of said support member relative to said sleeve member.

12. An apparatus as defined by claim 10, which includes an adjustment means connected to said support member for imparting a lifting force to said support member to tilt said support member relative to said sleeve member.

13. An apparatus as defined by claim 12, wherein said adjustment means includes an arm extending downwardly from said support member, said arm member positioned laterally of said central longitudinal axis, and an adjustment device connected to said arm member for moving said arm member.

14. An apparatus as defined by claim 1, which includes a shaft connected to said rotary plate member in coaxial alignment with said plate member axis of rotation, a support member surrounding said shaft and including an opening for receiving said shaft, and means for rotatably supporting said shaft within said support member opening.

15. An apparatus as defined by claim 14, which includes a drive unit connected to said shaft.

16. An apparatus as defined by claim 14, which includes means for rotatably connecting said connecting rod member second end portion to said rotary plate member, and said connecting rod member having a longitudinal axis angularly displaced from said central longitudinal axis.

17. An apparatus as defined by claim 14, which includes means for rotating said shaft within said support member.

18. Apparatus for supporting a continuous casting mold for oscillatory motion comprising, a foundation, a sleeve member positioned on said foundation, said sleeve including a longitudinal bore, a piston positioned for reciprocal movement in said bore, said piston having a longitudinal axis, means for connecting said piston to the continuous casting mold to transmit motion from said piston to the continuous casting mold, a plate member having a rotational axis, said plate member being axially displaced from said piston, means for supporting said plate member for rotation about said rotation axis, means for imparting rotational and tilting movement to said plate member such that said plate member rotates about said rotational axis and said plate member is tilted to displace said plate member rotational axis from said piston longitudinal axis, a rod member extending between said piston and said plate member, said rod member having opposite end portions and a longitudinal axis extending through said end portions, and means for universally connecting said rod member opposite end portions to said piston and said plate member such that said rod member longitudinal axis is displaced from said piston longitudinal axis to transmit oscillatory movement to the continuous casting mold upon rotation of said plate member.

19. Apparatus as set forth in claim 18, wherein said rod member includes one end portion having a bearing positioned on said piston longitudinal axis and a second end portion having a bearing laterally displaced from said piston longitudinal axis.

20. A method for oscillating a continuous casting mold comprising the steps of, connecting a continuous casting mold to a piston, supporting the piston for vertical reciprocal movement, supporting a plate displaced from said piston for rotation about an axis aligned with the longitudinal axis of the piston, supporting the plate for tilting movement about a tilt axis extending transversely through the piston longitudinal axis, connecting the plate to the piston to generate oscillatory movement of the piston upon rotation of the plate, and tilting the plate relative to the piston while rotating the plate to transmit oscillatory movement from the piston to the continuous casting mold.

* * * * *

UNITED STATES PATENT AND TRADEMARK OFFICE
CERTIFICATE OF CORRECTION

PATENT NO. : 5,038,848
DATED : August 13, 1991
INVENTOR(S) : Klaus GROTHE It is certified that error appears in the above-identified patent and that said Letters Patent is hereby corrected as shown below:

On the title page:

Under 'Related U.S. Application Data [63]', delete "Ser. No. DE88/00459" and insert --PCT Application No. PCT/DE88/00459--.

Under Attorney, Agent, or Firm, delete "Jungman" and insert --Ljungman--.

In column 1, line 34 and 35, after 'European Patent Application No.', delete "073089" and insert --0 173 089--.

Signed and Sealed this

Nineteenth Day of January, 1993

Attest:

DOUGLAS B. COMER

Attesting Officer   Acting Commissioner of Patents and Trademarks